(No Model.)
F. H. BAILEY & A. M. DIMMICK.
AIR MOISTENER.
No. 414,179. Patented Nov. 5, 1889.
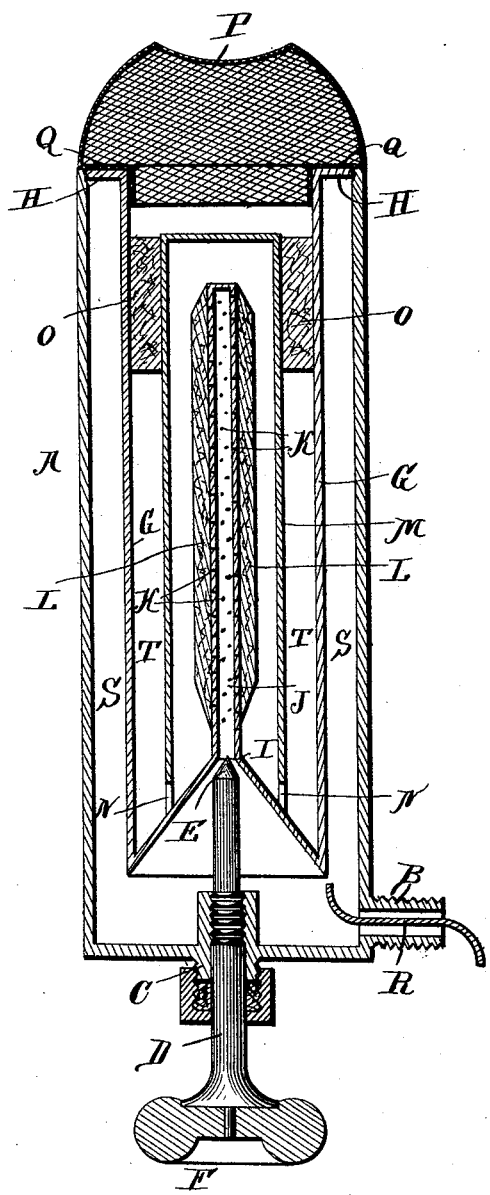

UNITED STATES PATENT OFFICE.

FRANK H. BAILEY AND ALBERT M. DIMMICK, OF WILKES-BARRÉ, PENNSYLVANIA.

AIR-MOISTENER.

SPECIFICATION forming part of Letters Patent No. 414,179, dated November 5, 1889.

Application filed March 23, 1889. Serial No. 304,396. (No model.)

*To all whom it may concern:*

Be it known that we, FRANK H. BAILEY and ALBERT M. DIMMICK, citizens of the United States, residing at Wilkes-Barré, in the county of Luzerne and State of Pennsylvania, have invented a new and useful Air-Moistener, of which the following is a specification.

This invention relates to an improved air-moistener or device for supplying moisture to the air of living-rooms, and it has for its object to provide a device which may be attached to a steam-radiator and provided for the escape into the room of a portion of the steam.

The invention consists in the improved construction of the device, which will be hereinafter described, whereby the steam is caused to escape slowly and noiselessly.

The invention further consists in the combination, with the device, of a wire or gauze basket, which may be filled with aromatic barks or herbs for the purpose of impregnating the escaping steam with an aromatic and healthful odor, as will be hereinafter fully described, and particularly pointed out in the claims.

In the drawing, the figure represents a vertical sectional view of our improved air-moistening device.

A designates a vessel, which may be cylindrical or of other suitable shape, and which is provided at its lower end with a nipple B, by means of which it may be attached to one of the steam-pipes of an ordinary radiator. The bottom of the vessel A has a packing-box C, through which passes the stem D of a valve E, having at its lower end a hand-wheel F, by means of which the said valve may be operated.

G designates a vessel of smaller diameter than the outer vessel A, within which it is placed, as will be seen in the drawings. The vessel G is provided at its upper end with the circumferential flange H, resting upon the upper edge of the outer vessel A, and which may be connected to the said vessel in any suitable manner, so as to form a tight joint.

The bottom of the vessel G may be conical, as shown, and it has the central perforation I, from which a pipe or tube J of small diameter extends upwardly within the said vessel G. The upper end of the tube J is closed, and said tube is provided throughout its length with numerous small perforations K K, around which is wrapped a packing L of any suitable material. The lower end of the tube J forms a seat for the valve E, which latter, by means of the hand-wheel F, may be operated so as to close the lower end of the said tube.

M is a vessel of smaller diameter than the vessel G, within which it is placed in an inverted position, so as to cover the tube J. The lower end of the vessel M, which rests upon the bottom of the vessel G, is provided with notches or openings N, and around its upper or closed end is wrapped suitable packing material O, which fills the space between the outer walls of the said vessel N and the inner walls of the vessel G.

P designates a suitably-constructed gauze or wire basket, which is placed upon the upper end of the vessel G, and which may be formed with shoulders Q, adapted to rest upon the flange H of the latter.

R designates a horizontal partition-plate arranged in the nipple B, and having a downwardly-curved inner end and upwardly-curved outer end which extends into the vessel A.

The operation of our invention is as follows: When steam is admitted in the nipple B, it passes over the partition R into the space or chamber S, between the inner walls of the vessel A and the outer walls of the vessel G, the valve E being meanwhile closed until the chamber S has been heated to a temperature depending upon the pressure of the steam—probably 220° or more. Any water which may condense in the chamber S runs back to the radiator or pipe, through the nipple B, under the partition R. When the valve E is opened, a portion of the steam rushes up through the pipe J, whence, escaping into the vessel or chamber M through the small openings K and the packing L, it is relieved from pressure with very little noise. The steam will now pass through the notches or openings N at the lower end of the vessel M into the space or chamber T between vessels M and G, in which space or chamber it will ascend, being superheated by contact with the hot walls of the vessel G, which form the outer walls of the space T. Condensed water which may drop down to the bottom of the vessel G is re-evaporated by contact with the heated walls of said vessel, passes upwardly through the same, the steam escaping through the packing O and basket P, where it is impregnated with an aromatic, healthful, and agreeable odor before escaping into the room.

Having thus described our invention, we claim and desire to secure by Letters Patent—

1. In an air-moistening device, the combination of the outer vessel having means for the admission of steam, an inner vessel having a flange at its upper end which forms a steam-tight joint between the said vessels, and a conical bottom having a central opening or valve-seat, an upwardly-extending perforated tube and packing surrounding said tube, and a vertically-movable stem extending through the bottom of the outer vessel and carrying a valve adapted to fit the valve-seat in the bottom of the inner vessel and to control the admission of steam into said inner vessel, where it may be reheated by contact with the heated walls thereof, substantially as set forth.

2. The combination of the outer vessel having a nipple and provided with a valve moving vertically in its bottom, an inner vessel having an upwardly-extending perforated tube, the lower end of which forms a seat for said valve, and provided with a flange to rest upon the upper edge of the outer vessel and form a tight joint with the latter, an inner vessel placed in an inverted position over the said perforated tube and having notches or openings at its lower end, and packing material placed around the upper end of said inner inverted vessel, substantially as and for the purpose set forth.

3. In an air-moistener, the combination of an outer vessel having a nipple for attaching it to a steam-pipe, a plate or partition arranged horizontally in the said nipple and having downwardly-curved inner and upwardly-curved outer ends, a vertically-movable valve arranged in the bottom of said outer casing, an inner vessel having a flange at its upper end forming a tight joint between said outer and inner vessels, a perforated tube extending upwardly within said inner vessel, and having a seat formed at its lower end for the vertically-moving valve, a vessel placed in an inverted position within the inner vessel and having notches at its lower end, and packing arranged in the space between the upper end of said inner inverted vessel and the walls of the surrounding vessel, substantially as herein set forth.

4. In an air-moistener, the combination, with the outer vessel having a nipple for the admission of steam and provided in its bottom with a vertically-moving valve, of the inner vessel having a conical bottom forming a seat for said vertically-movable valve, and from whence extends upwardly a perforated tube closed at its upper end and packing placed around the said tube, substantially as set forth.

5. In an air-moistener, the combination of an outer vessel having a nipple for the admission of steam and provided with a vertically-moving valve, an inner vessel having an upwardly-extending perforated tube, the lower end of which forms a seat for said valve, packing material wrapped around the said tube, a flange to close the upper end of the space between the outer and the inner vessels, a vessel placed in an inverted position within the inner vessel and having notches or openings at its lower ends, packing material placed in the space between the upper end of said inverted vessel and the walls of the surrounding vessel, and a gauze or wire basket arranged above the said inverted inner vessel, substantially as and for the purpose set forth.

In testimony that we claim the foregoing as our own we have hereto affixed our signatures in presence of two witnesses.

FRANK H. BAILEY.
ALBERT M. DIMMICK.

Witnesses:
GEO. A. WELLS,
GEO. B. HILLMAN.